United States Patent [19]

Wilhelmsson

[11] Patent Number: 4,666,402
[45] Date of Patent: May 19, 1987

[54] METHOD AND APPARATUS FOR PREHEATING SCRAP IN A BUCKET

[75] Inventor: Gunnar Wilhelmsson, Växjö, Sweden

[73] Assignee: Fläkt AB, Nacka, Sweden

[21] Appl. No.: 862,033

[22] Filed: May 12, 1986

[30] Foreign Application Priority Data

May 30, 1985 [SE] Sweden ................................. 8502666

[51] Int. Cl.⁴ .............................................. F27D 7/00
[52] U.S. Cl. ........................................ 432/24; 432/57;
432/242; 432/152; 266/901
[58] Field of Search ................... 266/901; 432/64, 57,
432/2, 24, 189, 205, 152, 121, 242, 244, 254.1,
254.2

[56] References Cited

U.S. PATENT DOCUMENTS

| | | | |
|---|---|---|---|
| 1,892,112 | 12/1932 | Moore et al. | 432/57 |
| 2,131,591 | 9/1938 | Keith et al. | 432/57 |
| 2,971,871 | 2/1961 | Beggs | 432/2 |
| 4,047,886 | 9/1977 | Heyrand | 432/189 |
| 4,268,977 | 5/1981 | Geiger | 432/242 |
| 4,326,556 | 4/1982 | Deutsch et al. | 432/242 |
| 4,373,911 | 2/1983 | Date et al. | 432/152 |
| 4,579,523 | 4/1986 | Laiquddin et al. | 432/2 |
| 4,596,526 | 6/1986 | Soliman | 432/24 |

Primary Examiner—Henry C. Yuen
Attorney, Agent, or Firm—Dann, Dorfman, Herrell and Skillman

[57] ABSTRACT

A method and a device for scrap preheating by means of hot steel furnace exhaust gases. A scrap bucket permits passage of gaseous medium therethrough and is closed by a cover with an exterior waterseal by providing an intermediate annular space having a controlled inlet for a purging medium which is connected to a pressure sensing means in the intermediate space. Purging medium is supplied to the intermediate space at a pressure not substantially less than the pressure in the inlet space in the bucket, so that all leakage is primarily the purging medium which flows outwardly to an outlet space. In a preferred embodiment the purging medium is recycled from the outlet space.

18 Claims, 3 Drawing Figures

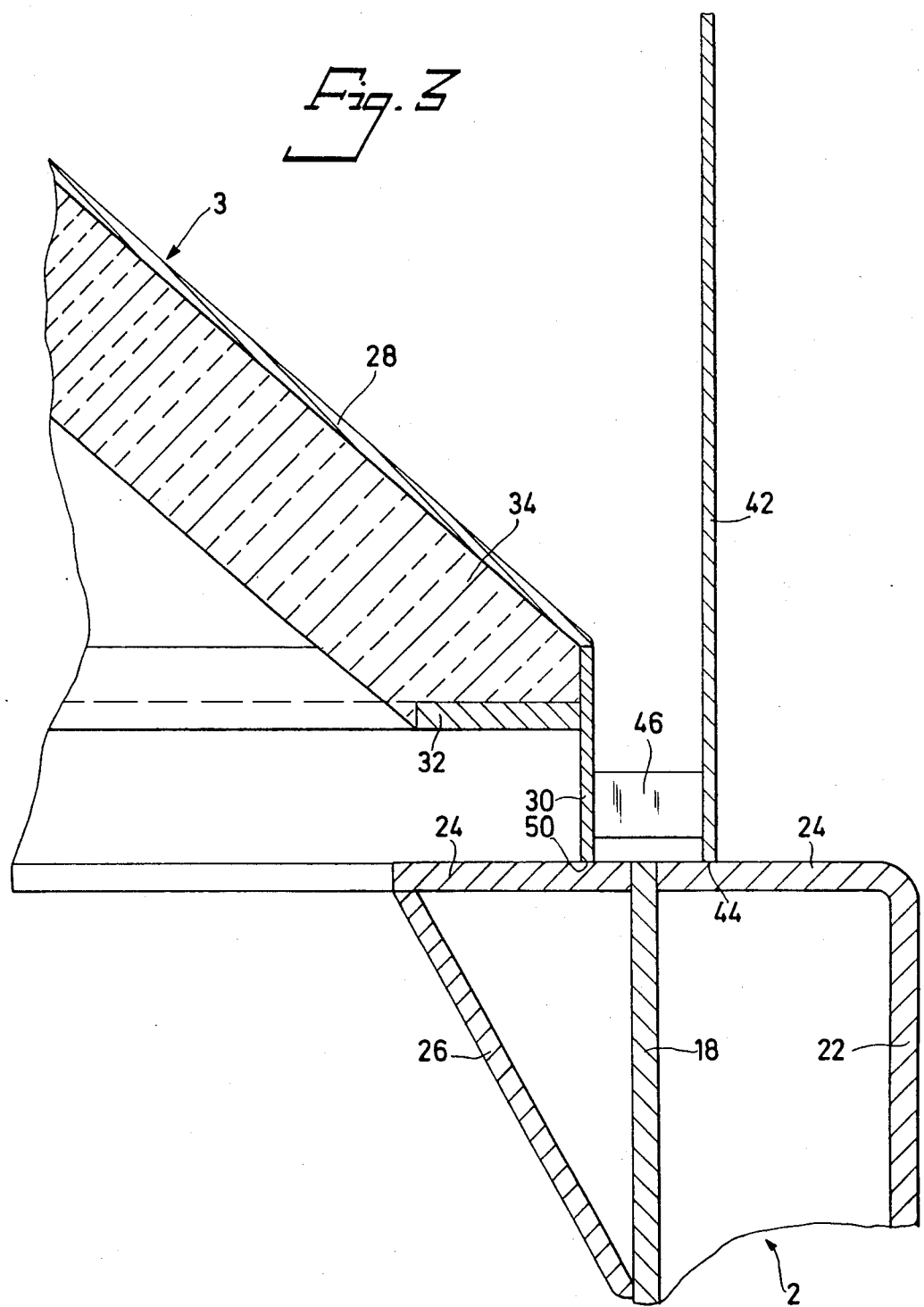

METHOD AND APPARATUS FOR PREHEATING SCRAP IN A BUCKET

FIELD OF THE INVENTION

The present invention relates to treating and/or preheatin scrap in a bucket by means of hot gases, preparatory to its treatment in a steel furnace. The inventor provides an improved method for such treatment, and apparatus for carrying out the method.

BACKGROUND OF THE INVENTION

Devices for preheating of scrap, which is to be charged to a steel furnace, particularly an electrical steel furnace, are known. The preheating of the scrap is carried out in order to partly save energy in the furnace and partly to dry the scrap and remove any ice or other material which may contaminate the steel, which may present pollution problems in the gaseous discharge, or may cause severe accidents when the material is brought in contact with molten metal.

The preheating may be performed by supplying heat from separate burners or by utilizing hot gases, which have been generated during a high temperature process. Particularly, hot gases from the furnace, to which the preheated scrap is to be charged, are utilized in this case. However, the hot gases may also come from another steel furnace or any other furnace, e.g. gas-fired furnaces for annealing and holding. The hot gases may in this case be utilized directly or via an interconnected heat exchange unit.

Such scrap preheating devices have been described in the articles "Scrap preheater for electric arc furnace", *Iron and Steel Engineer,* April 1983, pages 45-50 (see also UK Patent Publication No. GB 2,082,738 A) and "EF Update 82/Four Scrap preheating systems", 33 Metal Producing, November 1982, pages 50-53. These known devices principally comprise a preheating chamber which is connected to an outlet pipe to remove expended preheating gases. A scrap bucket having a gas-transmitting bottom portion is placed in the preheating device on a suitable support. The preheating chamber and the scrap bucket are covered by a cover having a central inlet connected to an inlet pipe for hot gases. The device is provided with a seal, which is a waterseal, between the cover and the wall of the preheater chamber. Also, there is a seal between the upper edge of the scrap bucket, which comprises an annular seating surface and an annular sealing element on the cover. This sealing element may comprise an edge ring or flange projecting downwardly on an inner hood, which forms a part of the cover, or a part of a separate, e.g. bellows shaped element.

In operation, the hot gases are fed through the inlet pipe and descend through the scrap charge and leave the preheater device through the outlet pipe to be conducted to e.g. a flue gas cleaner before discharge. In this case, a hydraulic head of about 200 mm water column between the top side of the scrap charge and the outside of the scrap bucket will arise.

The artisan has found that it is not possible to obtain an efficient sealing between the seating ring of the scrap bucket and the sealing element of the cover. Due to a normally rough handling, influenced by large forces, which particularly the scrap bucket but also the cover is subjected to during a normal operation, leakage gaps having a size of from 1 to 5 mm between the seating ring and the sealing element will soon appear. Consequently, a substantial portion of the hot gases will issue through these leakage gaps without passing through the scrap. In this manner, efficiency of preheating in relation to the heat quantity available in the preheating gases is reduced. This results in large economical losses, since that energy, which principally may be obtained free of charge from the preheating gases, must be replaced by expensive electrical energy in the electrical steel furnace to heat the scrap before the smelting. These economical losses are not limited to just the direct energy expenses. Thus, when an increased preheating is used, a shorter charging time can be obtained, which results in an increased utilization of the entire steel mill, and thus reduced capital outlay for each ton of produced steel. Each minute, with which the smelting time can be reduced due to an increased preheating, is extremely valuable.

The artisan has already tried to stop leakage between the seating ring of the scrap bucket and the sealing element of the cover. However, considerable inconveniences are then encountered due to the high temperature of the preheating gases, often about 800°. He has tried to use sand as a sealing material but only with limited results. He has also tried a sand-containing asbestos hose. However, the asbestos hose has a very limited durability under actual operating conditions and may contribute to an environmental danger. Thus, none of the previously suggested solutions results in a satisfactory solution to the problem due to leaking hot gases.

SUMMARY OF THE INYENTION

The object of the present invention consequently is to develop a method and a device, by means of which it is possible to virtually completely eliminate a preheating gas leakage from the inlet space above the scrap charge to the outside of the scrap bucket.

In order to attain this object the method of the present invention confines the hot gases by surrounding the seating surface with gaseous medium at a pressure not substantially less than the pressure with the inlet space.

According to the invention, apparatus is provided to establish an intermediate purging chamber and means to supply a purging gas to the intermediate chamber with a controlled flow to generate the desired pressure in the chamber.

In a first embodiment, the intermediate purging space communicates with the surrounding ambient air through at least one inlet connection piece provided with flow limiting means. In this embodiment a certain cooling is obtained, since comparatively cold exterior air is fed to the outside of the scrap bucket and at least temporarily may infiltrate into the inlet space. However, such infiltration influences the scrap preheating less than what leakage would do.

According to a second embodiment of the invention the intermediate space communicates with the annular exterior space on the outside of the bucket by means of a pipe including a fan or the like to blow a gas from the exterior space to the intermediate space. In this manner, a closed cycle is obtained, the gas leaking from the intermediate space to the exterior space then being blown into the intermediate space by means of the fan. Thus, no heat losses due to dilution with air at room temperature result.

According to still another feature of the invention, there are provided in the inlet space and in the intermediate space respectively, pressure sensing means, which sense the pressures in the respective spaces or at least the relative pressure differential between them.

According to a preferred embodiment of the invention, there are flow limiting means in the hot gas inlet and the pipe, which leads to the intermediate space respectively. By means of these flow limiting means the pressure in the intermediate space can be controlled. The flow limiting means includes a damper according to a preferred embodiment. This damper can be regulated manually when reading the sensed pressures and the pressure difference respectively, in order to obtain substantially the same pressure in the inlet space and the intermediate space.

According to a particularly preferred embodiment of the invention, the adjustment of the damper is monitored by means of a regulating device, which receives signals from said pressure sensing means and alters the adjustment of said damper subject to the sensed pressures.

BRIEF DESCRIPTION OF THE DRAWINGS

The invention will be described in more detail in the following by means of some embodiments, reference being made to the accompanying drawings, in which:

FIG. 3 is a cut view on an enlarged scale of the encircled area designated at III in FIG. 1, showing the sealing between the cover and the scrap bucket and the mounting of a refractory lining in the cover.

DESCRIPTION OF THE PREFERRED EMBODIMENTS

Figure 1:
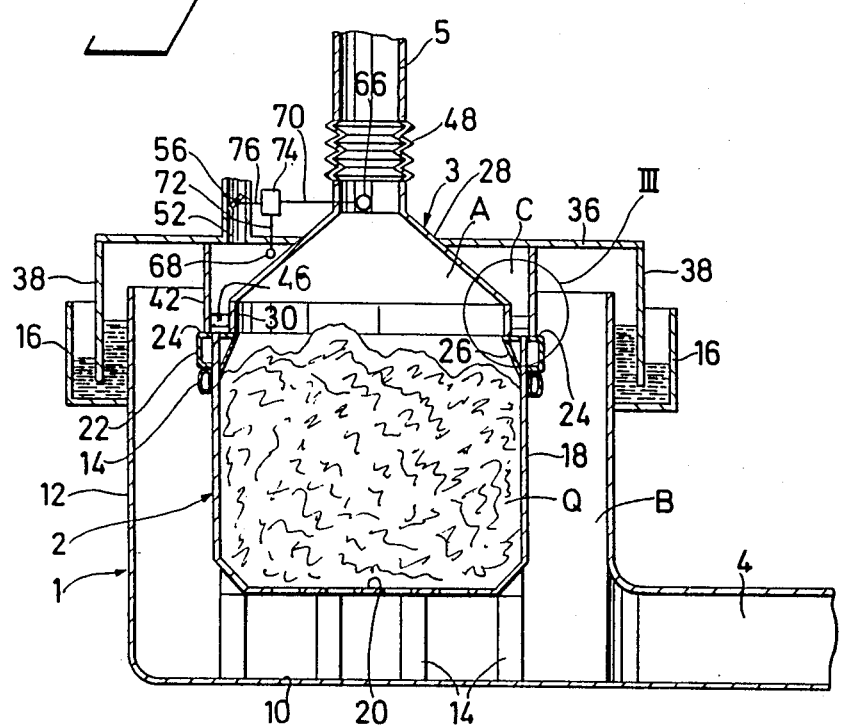
FIG. 1 is a schematic cross section of a scrap preheating apparatus according to invention with its insulating or refractory lining omitted.

FIG. 1 shows a scrap preheating device according to the invention, which dries and/or preheats scrap, comprising a preheating chamber 1, a scrap bucket 2 and a cover 3. preheating chamber 1 is connected to an outlet conduit 4 which is connected to a structure device to discharge used preheating air. It is provided with a floor 10 and a wall 12 on all its sides, which are gas-tight and insulated on their interior side by means of bricks and/or any other refractory insulating material. The Preheating chamber is also provided with a supporting rack 14, which in the present invention includes a ring encircling the bucket 2 below a seating ring 22 encircling the open top of the bucket so as to support and retain the scrap bucket 2 in preheating chamber 1. Such supporting devices are known per se and may be of any kind whatsoever. At the upper edge of wall 12 there is a seal 16 all around in the form of open-topped water-filled channel or moat which cooperates with the cover 3 to form a water seal.

The scrap bucket 2 is provided with a wall 18, which is gas-tight at least as to its upper portions, and a bottom structure 20 as well as supporting means, which cooperate with supporting rack 14 of the chamber. The supporting means consist of reinforced material portions, e.g. the ring 22 having a rectangular cross section. Furthermore, surrounding the open top of the scrap bucket there is a level seating surface 24, which provides a seat for seating the cover 3 of the preheating device. Seating surface 24 coincides with ring 22 on the exterior side of the bucket wall. On its interior side it comprises a ring-flange, which at its interior edge is fastened to a conical base plate 26, the other end of which is fastened to wall 18 of the scrap bucket. In this manner, a very deformation-resistant design is obtained, which renders seating surface 24 comparatively insensitive to deformation-producing handling. As has been mentioned earlier, such deformation can not be avoided completely when handling scrap.

Cover 3 of the device comprises an inner preheating hood 28, which is connected to an in inlet pipe or conduit 5 for hot gases. Around the circumference of hood 28 there is a sealing element 30 in the form of a substantially vertical ring forming a cylindrical flange, which abuts the level seating surface 24 at 50. Ring 30 is supported by an interior radial flange 32, which also serves as a lower restriction for a refractory insulating material 34, which is disposed on the interior side of hood 28. Cover 3 also comprises an exterior annular cover plate 36, which covers the space between hood 28 and wall 12 of the preheating chamber. The cover plate is, at is interior edge, mounted on the hood 28 in a sealing fashion and supports, along its circumference, a substantially vertical sealing plate 38, which projects downwardly into the water-filled channel 16. Cover plate 36 is likewise provided, on its interior side, with a refractory isolating material shown at 40 in FIG. 2 in order to prevent heat discharge to the environment. Furthermore, from cover ring 36 a partition wall 42 projects downwardly surrounding the hood 28 in spaced parallel relation to the cylindrical flange 30 and is terminated in its lower part by a seating edge 44 engaging against seating ring 24 of the scrap bucket. Also, a number of stay means 46 are disposed between vertical sealing flange 30 and partition wall 42.

Inlet pipe 5 comprises a flexible section 48 which is moveable in an axial direction, e.g. a bellows, which renders it possible to lift up and to turn aside cover 3.

In operation, there is in the scrap preheating device an inlet space A between inner hood 28 and a scrap charge Q, which is positioned in scrap bucket 2. Between the exterior side of the scrap bucket and wall 12 and floor 10 of the preheating chamber there is hollow tubular space B. Between these two spaces there is an annular intermediate space C, which is defined by the exterior wall of hood 28, the interior wall of cover 26, partition wall 42 and an annular portion of seating surface 24 of the scrap bucket. As shown in FIG. 3, the intermediate space is provided with a first seat 50, which comprises the seating ring 30 and seating surface 24, adjacent inlet space A, as well as a second seat 44 between partition wall 42 and seating surface 24. As shown in FIG. 1, the intermediate space C also is provided with an inlet pipe 52 for purging gas, which is to be described hereinafter. In a first embodiment the inlet pipe comprises an inlet connection piece 52 having a flow control damper 56. In a second embodiment according to FIG. 2 the purging inlet comprises a pipe 54 with a flow control damper 56. Pipe 54 is connected to the outlet of a fan 60, the inlet 62 of which is connected to tubular space B surrounding the bucket. The fan is driven by a motor 64. Pipe 54, fan 60 and inlet 62 suitably are provided with heat insulation or a heat insulated case (not shown).

In inlet space A a first pressure sensing means 66 is provided. As is shown in FIG. 1 this pressure sensing means may also be placed in inlet pipe 5 and consequently, it is protected against scrap, which is pushed upwardly, since, when a bulky scrap is charged, it may extend upwardly above the upper edge of open top of the scrap bucket. In intermediate space C a second pressure sensing means 68 is provided. Wires 70 and 72 respectively connect the pressure sensing means to a regulating device 74. Regulating device 74 adjusts by conventional adjustment means shown in the figures by means of a line 76, the flow control damper 56 subject to the sensed pressures in spaces A and C.

Both embodiments of device are used as follows. The absolute pressure in inlet space A is higher than the absolute pressure in the outlet space B. By means of sensing means 66,68 regulating device 74 and damper 56 supply a regulated flow of purging air or gas through either inlet pipe 52 or 54 respectively to intermediate space C in order to obtain substantially the same pressure in the intermediate space and the inlet space. Since the pressure is substantially the same in inlet space A and in intermediate space C virtually no air stream through first sealing 50 takes place. Due to the pressure difference between outlet space B and intermediate space C virtually all of the supplied purging air or gas will pass through the second seat 44 and into space B. In this manner, it is possible to prevent the supplied preheating gaseous medium from leaking through seat 50 to outlet space B. Such a leakage would surely take place, if there were no intermediate space, to which purging air or gas is supplied.

According to one embodiment, the purging medium is fed through inlet connection piece 52 directly from the surrounding ambient air. This is an economical solution, which offers substantial improvements as compared to known techniques. However, in this manner cold exterior air may be fed to the exterior side of the scrap bucket, which results in a certain cooling. Also, at least temporarily and/or locally, a certain leaking of exterior air to the inlet space occurs, which cools the preheating gas.

Figure 2:
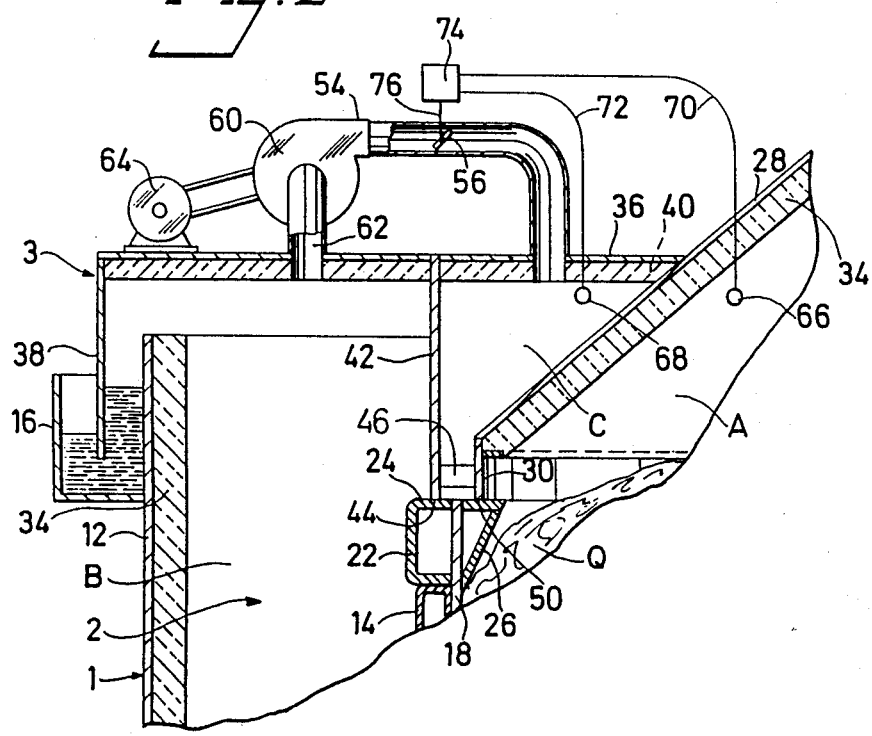
FIG. 2 is a fragmentary section of a detail of the scrap preheating device of FIG. 1 with an alternate structure for supplying gaseous purging medium to the intermediate space.

However, according to the embodiment shown in FIG. 2 the purging medium is drawn from outlet space B. In this manner, a closed circuit is obtained and no heat losses, due to admission of comparatively cold exterior air, occur.

The pressure sensing may be performed in any known manner. It may be performed by means of absolute measurements or measurement of the pressure differential in comparison to the surrounding ambient air or by means of measurement of the differential pressure between inlet space A and intermediate space C.

In its simplest embodiment, the pressure measurement may be performed by means of two tubes, which are open to the respective spaces and are provided with an intermediate U-tube filled with a liquid. The adjustment of flow control damper 56 can be performed manually, either directly or by means of a remotely controlled servomotor. However, manual adjustment does not provide accurate pressure adjustment, because the conditions change during the preheating process, e.g. due to the removal of water. In order to have an accurate adjustment of damper 56, it is necessary to have a regulation device 74 for continuously regulating the flow control damper adjustment because of occurring pressure changes.

However, it is in fact possible to make a one-time adjustment of damper 56 and still achieve a better result than using known techniques. However, this results in varying pressure equalization when changing buckets from one change to another, since the flow resistance through the bucket varies subject to the character of the scrap which the bucket contains. Also, the leakage at the seating surface varies from time to time due, for example, to the fact that scrap particles may overlie seating surface 24, and prevent proper seating at 44 or 50.

Typical pressure conditions in a scrap preheating device according to the invention is a negative pressure of 400 mm water column in outlet space B and a negative pressure of about from 150 to 200 mm water column in inlet space A and intermediate space C. In that respect, it is possible to choose a pressure in the intermediate space, which is somewhat higher, about 5 mm water column, than the pressure in the inlet chamber, so long as the pressure in the chamber defining the space C is not substantially less than the pressure in the inlet chamber A.

The dimensions of a preheating device according to the invention are considerable, since a steel furnace often has a charge capacity of from 50 to 100 tons, which are fed in two chargings. Also, the inlet pipe to the intermediate space is given a considerable size. In an actual case according to the second embodiment a fan is suggested having an outlet diameter of 400 mm and run by a motor of 7.5 kW.

The invention is not limited to the embodiments described above, but can be modified with the scope set forth by the following patent claims, without deviating from the inventive idea.

I claim:

1. A method for preheating a scrap charge in a scrap bucket having a top opening within a seating surface and a bottom structure constructed and arranged to transmit gaseous medium therethrough comprising the steps of positioning said bucket in a preheating chamber having an outlet conduit for discharging gaseous medium so that said bottom structure is in gaseous communication with said outlet conduit;

providing a cover for said preheating chamber, said cover having an inlet for admitting heated gaseous medium for use in preheating the scrap;

positioning said cover in circumscribing relation to said top opening of said bucket so that the heated gaseous medium may pass from the cover through the scrap in the bucket and through the bottom structure to said outlet conduit;

providing partition within said chamber engaging the top of said bucket surrounding said cover in spaced relation thereto to form an intermediate chamber inside said partition and an outlet chamber outside said partition in communication with said outlet conduit; and supplying gaseous medium to said intermediate chamber at a pressure not substantially less than the gaseous medium in said inlet and greater than the pressure of the gaseous medium in said outlet chamber;

whereby any leakage between said partition and said bucket seating surface is from said intermediate chamber towards said outlet chamber.

2. A method according to claim 1 wherein the pressures of said gaseous medium in said inlet and said outlet are both below the ambient air pressure surrounding said preheating chamber, and said step of supplying purging gaseous medium to said intermediate chamber comprises supplying ambient air to said chamber through a flow control device which controls said pressure at which the gaseous medium is supplied to said intermediate chamber.

3. A method according to claim 2 including the step of sensing the pressure in said inlet and said intermediate chamber and regulating the flow control device to maintain the pressure in the intermediate chamber above the pressure in the inlet so that any leakage of gaseous medium between said cover and said seating surface is in the direction from said intermediate chamber towards said inlet.

4. A method according to claim 2 including the step of sensing the pressures in said inlet and said intermediate chamber and regulating said control device to maintain the pressure differential between the inlet and the chamber substantially zero to minimize the leakage between said intermediate chamber and said inlet.

5. A method according to claim 1 wherein said purging gaseous medium supplied to said intermediate chamber is taken from the preheating chamber in communication with the bottom structure of the bucket and is blown into said intermediate chamber.

6. A method according to claim 5 including the step of sensing the pressure difference between said inlet and said intermediate chamber and regulating the flow of gaseous medium blown into said chamber to maintain the said pressure differential substantially zero.

7. A method according to claim 5 including the step of sensing the pressure difference between said inlet and said intermediate chamber and regulating the flow of gaseous medium blown into said chamber to maintain the pressure in said intermediate chamber above the pressure in the inlet.

8. Apparatus for drying and/or preheating a charge of scrap in a scrap bucket having an annular seating surface with a top opening therein and a bottom structure affording transmission of gaseous medium from the top opening through the bottom structure comprising
a preheating chamber having an outlet conduit for withdrawing gaseous medium therefrom;
means supporting a scrap bucket in said chamber in a position to afford passage of gaseous medium from said bottom structure through said outlet conduit;
a cover having a hood adapted to engage said seating surface surrounding the opening thereof, said hood having inlet means to introduce gaseous heating medium into said top opening, said cover having means providing a seal between said cover and said chamber outside of said hood;
partition means in said cover adapted to engage the seating surface of said bucket in spaced surrounding relation to the engagement of said hood to provide a chamber in said cover intermediate said hood and said preheating chamber surrounding the bucket; and
means to supply a gaseous purging medium into said intermediate chamber at a pressure not substantially less than the pressure of the gaseous heating medium within said hood and greater than the pressure of the gaseous medium in said preheating chamber surrounding said bucket.

9. Apparatus according to claim 8 wherein said preheating chamber has means defining a moat surrounding said chamber adjacent its top, said cover having a peripheral wall depending into said moat to provide a water seal between said cover and said chamber.

10. Apparatus according to claim 8 wherein said scrap bucket has a support ring extending about its periphery at the top thereof, said support means including means to engage under said support ring to support said bucket in said chamber, the upper surface of said ring comprising said seating surface, said hood and said partition means engaging against the upper surface of said ring.

11. Apparatus according to claim 8 wherein said hood inlet includes a flexible connector and a conduit adapted to connect to a supply of gaseous heating medium.

12. Apparatus according to claim 8 wherein said cover comprises a cover element coextensive with the outer periphery of said preheating chamber, said hood structure depending downwardly centrally of said cover to engage said bucket seating surface.

13. Apparatus according to claim 12 wherein said hood terminates in a downwardly extending cylindrical flange adapted to engage said seating surface and said partition comprises a cylindrical partition in spaced parallel relation to said cylindrical flange.

14. Apparatus according to claim 8 wherein said outlet conduit of said preheating chamber includes means to connect said outlet conduit to a suction device to reduce the pressure in said chamber below the ambient air pressure surrounding said preheating chamber.

15. Apparatus according to claim 8 wherein said supply means includes an inlet passage for said purging medium into said intermediate chamber, and flow control means in said passage to control the pressure of said purging medium in said chamber.

16. Apparatus according to claim 15 wherein said outlet conduit of said preheating chamber is adapted to be connected to a suction device to reduce the pressure in said chamber surrounding said bucket below ambient air pressure, and wherein further said purging inlet for said intermediate chamber is connected to the ambient air surrounding said preheating chamber whereby said purging medium is ambient air.

17. Apparatus according to claim 15 wherein said supply means includes fan means interconnecting said preheating chamber surrounding said bucket and said intermediate chamber, and means to drive said fan means to blow medium from said preheating chamber into said intermediate chamber at a pressure not substantially less than the pressure of the heating medium in said hood inlet.

18. Apparatus according to claim 15 including means to sense the pressure differential between said hood inlet and said intermediate chamber and regulating means connected to said sensing means to regulate said flow control means to maintain the pressure differential between said intermediate chamber and said hood inlet substantially zero.

* * * * *